United States Patent
Viola et al.

(10) Patent No.: US 7,030,195 B2
(45) Date of Patent: Apr. 18, 2006

(54) PROCESS FOR THE PREPARATION OF POLYBUTADIENE WITH A LOW BRANCHING DEGREE

(75) Inventors: Gian Tommaso Viola, Cervia (IT); Fabio Bacchelli, Ravenna (IT)

(73) Assignee: Polimeri Europa S.p.A., Brindisi (IT)

( * ) Notice: Subject to any disclaimer, the term of this patent is extended or adjusted under 35 U.S.C. 154(b) by 35 days.

(21) Appl. No.: 11/038,117

(22) Filed: Jan. 21, 2005

(65) Prior Publication Data
US 2005/0182213 A1 Aug. 18, 2005

(30) Foreign Application Priority Data
Jan. 22, 2004 (IT) .......................... MI2004A0076

(51) Int. Cl.
*C08C 2/00* (2006.01)
*C08L 9/00* (2006.01)

(52) U.S. Cl. .................. 525/333.2; 525/232; 525/387; 524/572; 526/164

(58) Field of Classification Search ................ 525/232, 525/333.2, 387; 524/572; 526/164
See application file for complete search history.

(56) References Cited

U.S. PATENT DOCUMENTS 4,990,573 A * 2/1991 Andreussi et al. ....... 525/332.3
5,567,784 A 10/1996 Wieder et al.
5,681,886 A * 10/1997 Fuchs et al. ................ 524/493

FOREIGN PATENT DOCUMENTS

| EP | 0 863 165 A1 | 9/1998 |
|---|---|---|
| GB | 952021 | 3/1964 |
| WO | WO 03/018649 A1 | 3/2003 |

* cited by examiner

*Primary Examiner*—Fred Teskin
(74) *Attorney, Agent, or Firm*—Oblon, Spivak, McClelland, Maier & Neustadt, P.C.

(57) ABSTRACT

Process for the preparation of polybutadiene with a low branching degree which comprises:
(a) a first polymerization step of butadiene in the presence of organic solvents and in the presence of a catalytic system comprising (a1) a derivative of neodymium;
(a2) an aluminum alkyl having general formula (I) $AlR_1R_2R_3$;
(a3) an organo aluminum derivative containing at least one halogen atom, preferably chlorine;
the above first step being carried out up to a conversion of butadiene >98% to give a linear polybutadiene ($g_m$=1) with a content of 1,4-cis units greater than 93% and a Mw/Mn ranging from 2.2 to 2.9;
(b) treatment of the polymeric solution obtained at the end of step (a) with a peroxide,
(c) recovery of the polybutadiene with a low branching degree obtained at the end of step (b).

34 Claims, 1 Drawing Sheet

PROCESS FOR THE PREPARATION OF POLYBUTADIENE WITH A LOW BRANCHING DEGREE

The present invention relates to a process for the preparation of high cis polybutadiene with a low branching degree. The polybutadiene thus obtained has an excellent balance between the viscosity and elastic properties, which leads to a significant improvement in the processability.

The present invention also relates to sulfur vulcanizable blends in which the elastomeric part comprises the high cis polybutadiene with a low branching degree, object of the present invention.

It is known that the introduction of branchings in a linear polymeric structure, leads to a series of applicative advantages, among which, above all, an improvement in the processability.

The processability of elastomeric material is an extremely important parameter in the transformation industry which adds various fillers to the rubber, among which reinforcing fillers (for example silica and carbon black), using closed mixers with an defined internal geometry. As the user's aim is to maximize the yield of its plants, it is necessary for the Theological characteristics of the material to be such as to enable the filler to be incorporated in the shortest possible time.

An optimal distribution of the latter gives rise to improved mechanical and dynamic characteristics of the vulcanized product. The dispersion of the filler is correlated to parameters measured with different techniques among which electric conductivity, in the case of black blends, the Payne effect, or in a very practical way, the Mooney viscosity before and after incorporation. Unless there are degradation phenomena to be avoided, the Mooney viscosity of the blend is generally greater than that of the starting polymer, but the increase must be limited.

The main macro-molecular parameters on which it is possible to intervene for improving the dispersion of the filler in the rubber, are the molecular weight distribution and the presence of branched chains.

In absolutely general terms, which can be applied to all rubbers and their processing, it should be pointed out that to introduce a solid material into a rubber matrix by the use of a machine, requires a work which must be transferred from the machine itself to the material by means of shear stress; the material must therefore respond in viscoelastic terms to transfer this work from the volume area immediately near the mechanical part towards the more internal areas, through an action with respect to the filler particles which must be firstly incorporated and then dispersed as homogeneously as possible. The polymeric material requires an elastic component sufficient for carrying out the function of transferring the work from the machine to the rubber, but this quality should not be excessive as too much elasticity would make the incorporation difficult: it should be remembered, in this respect, that it is impossible to process a vulcanized rubber which represents a conceptual reference of an (almost) purely elastic material.

The aim is to follow the correct compromise between the viscosity and elasticity: the "correct" attribute is only used in qualitative terms as there is no experimental base sufficient for identifying a quantitative correlation between the damping factors of the material and the shear factors applied in the mixer. In macromolecular terms, a material is required, which has a sufficient elasticity, this latter property deriving from the appropriate macromolecular structure; in the case of a linear polymer, such as polybutadiene synthesized with catalytic systems based on Nd and aluminum alkyls, the elasticity required during the processing is provided by the high molecular weight fractions. It is known that a molecular weight distribution which is too wide and therefore containing both the high molecular weight fraction (for example $>10^6$) and also the low molecular weight fraction (for example $<5\times10^4$), is not suitable for being processed with traditional blending cycles (short) for providing a vulcanized product with sufficiently good technological characteristics. The high molecular weight fraction, necessary, as already mentioned, for transmitting the work, is excessive, causing a drop in the process yield, as the material tends to break thus reducing the shear stress during the mixing phase. Whereas the presence of high molecular weight fractions on the one hand favours dispersion, on the other, it imposes a longer incorporation (wetting) phase and consequently increased blending times.

Once the practical limit of the high molecular weight variable has been established, it is evidently not possible to eliminate this fraction without also eliminating the low molecular weight part complementary thereto: it should be remembered that the material has quite a symmetrical molecular weight distribution around a central molecular weight and that its Mooney viscosity is typically equal to 40–50: this means that with a wide molecular distribution, there will be low and high molecular weights, of which the former contribute as a kind of plasticizer (viscous component) and the latter, as already specified, as elastic component. The reduction or elimination of the high and low molecular weight fraction, ideally leading to a Poisson distribution, produces a polymer without internal plasticizers which, upon processing, has the typical behaviour defined in practice as "cheesy" or "dry" in relation to the molecular weight; another negative characteristic of this type of material is the manifestation of a cold flow phenomenon which appears in the tendency of the rubber balls, in the typical storage times, to flow and consequently deform, making the use of automatic feeding systems of the transformation lines, impossible.

The problem of having a material with a sufficient elasticity, the latter however not deriving from the presence of high linear molecular weights, correlated to a wide molecular weight distribution (Mw/Mn>3.5, for example), can be overcome by introducing a sufficient number of branchings on the molecular chain.

The branching of a naturally linear polymer can only be effected through a post-modification operation: herein, the definition "naturally linear" means a macrostructure whose reference catalytic system is incapable of producing branchings in the propagation phase of the kinetic chain.

Apart from the techniques for introducing branchings in a molecular chain, which are described hereunder, it is evident that, as this is a post-modification, a polymer with a suitable molecular architecture must be modified, in order to obtain a well-processable material from which a vulcanized product with good dynamic characteristics, can be obtained. In other words, inducing a branching (and therefore elasticity) in a polymer with a wide molecular distribution (and consequently already elastic due to the contribution of the high molecular weight fractions) becomes useless and harmful.

A method for effecting the above post-modification of polydienes is described in U.S. Pat. No. 5,567,784, which treats polybutadiene with a sulfur compound selected from $S_2Cl_2$, $SCl_2$, $SOCl_2$, preferably $S_2Cl_2$. This treatment is preceded by a degassing phase of the reaction mixture, thus eliminating the low-boiling components of the reaction mixture, in particular the non-reacted diene monomers.

The above process however has the disadvantage of introducing —S—S— bonds, which can degrade in the processing phase of the polydienes.

A process has now been found which overcomes the drawbacks described above as it allows branchings to be introduced into the macromolecule of polybutadiene, by the introduction of carbon-carbon bonds, which are more stable than sulfur-sulfur bonds.

In accordance with this, the present invention relates to a process for the preparation of polybutadiene with a low branching degree having the following characteristics:

branching index value ($g_m$) lower than 1, preferably from 0.80 to 0.99, even more preferably from 0.90 to 0.96;

damping coefficient value (tan δ), defined as the trigonometric tangent of the ratio between the viscous modulus (G") and the elastic modulus (G') [tan δ=G"/G'] measured at 0.01 Hz, 100° C. and 1% of strain, ranging from 0.80 to 1.40, preferably from 0.90 to 1.30, even more preferably from 1.15 to 1.25;

Mooney viscosity lower than 49, preferably from 35 to 48, even more preferably from 39 to 46;

$M_w/M_n$ lower than 2.9, preferably from 2.4 to 2.7, even more preferably from 2.5 to 2.6;

percentage of 1,4-cis units higher than 93%, preferably higher than 94%, even more preferably from 95% to 99%;

the above process being effected by the polymerization of 1,3-butadiene in the presence of neodymium catalysts, the above process comprising:

(a) a first polymerization step of butadiene in the presence of organic solvents and in the presence of a catalytic system comprising (a1) a derivative of neodymium selected from neodymium carboxylates with a molar ratio $H_2O/Nd$ lower than 1, preferably lower than 0.1, and a molar ratio —COOH/Nd lower than 2, preferably lower than 0.5; (a2) an aluminum alkyl having the general formula (I) $AlR_1R_2R_3$ wherein $R_1$ and $R_2$, the same or different, are an alkyl radical containing from 1 to 10 carbon atoms or a hydrogen atom, $R_3$ is an alkyl radical containing from 1 to 10 carbon atoms; (a3) an organo aluminum derivative containing at least one halogen atom, preferably chlorine; the above first step being carried out up to a butadiene conversion ≧98%, preferably greater than 99%, to give a linear polybutadiene ($g_m$=1) with a content of 1,4-cis units greater than 93%, and an $M_w/M_n$ ranging from 2.2 to 2.9;

(b) treatment of the polymeric solution obtained at the end of step (a) with a peroxide, preferably in a quantity ranging from 0.2 to 2 grams of peroxide per 1,000 grams of initial butadiene, even more preferably from 0.4 to 1 gram of peroxide per 1,000 grams of butadiene, until polybutadiene with a low branching degree is obtained;

(c) recovery of the polybutadiene with a low branching degree obtained at the end of step (b).

The $g_m$ parameter (for its definition see the experimental part) is an index of the linearity or non-linearity of the polybutadiene chain. A $g_m$ value equal to 1 is characteristic of a linear structure; values lower than 1 are typical of branched polymers. The lower the $g_m$ value, the greater the branching degree of the polymeric chain.

The term "Mooney viscosity" refers to the viscosity of the polymer measured at 100° C. with a wide rotor (L) by preheating for 1' and effecting the measurement for 4 minutes according to the ASTM D 1646 method.

In step (a), the butadiene is present in a concentration ranging from 5 to 40% by weight, preferably from 10 to 25% by weight. It is preferable to use a distilled butadiene and, optionally, treated with molecular sieves and/or activated alumina.

As far as neodymium carboxylates are concerned, the preferred is $Nd(versatate)_3$, having a molar ratio $H_2O/Nd$ lower than 1, preferably lower than 0.1, and a molar ratio —COOH/Nd lower than 2, preferably lower than 0.5. The neodymium carboxylate is used in a quantity ranging from 0.1 to 10 mmoles per 1,000 grams of butadiene to be polymerized. When the quantity is lower than 0.1 mmoles, the reaction rate is reduced to unacceptable values, whereas when the quantity is higher than 10 mmoles, the concentration of the catalyst is too high and the average molecular weight of the resulting product is too low for use. The neodymium carboxylate is preferably used in a quantity ranging from 0.5 to 5 mmoles per 1,000 g of monomer.

With respect to the compounds (a2), i.e. aluminum alkyls having general formula (Ia) $AlR^4_3$ or (Ib) $AlHR^4_3$ wherein $R^4$ represents an alkyl radical containing from 1 to 10 carbon atoms, typical examples are aluminum trimethyl, aluminum triethyl, aluminum tri-n-propyl, aluminum tri-isopropyl, aluminum tri-n-butyl, aluminum isobutyl, aluminum tri-t-butyl, aluminum tripentyl, aluminum trihexyl, aluminum tricyclohexyl, aluminum trioctyl, aluminum diethyl hydride, aluminum di-n-propyl hydride, aluminum di-n-butyl hydride, aluminum di-isobutyl hydride, aluminum di-hexyl hydride, aluminum di-isohexyl hydride, aluminum di-octyl hydride, aluminum di-isooctyl hydride, aluminum ethyl dihydride, aluminum n-propyl dihydride, aluminum isobutyl dihydride. Among the above organic compounds of aluminum, aluminum triethyl, aluminum tri-isobutyl, aluminum diethyl hydride and aluminum di-isobutyl hydride are preferred.

As far as the organo aluminum derivatives containing at least one halogen atom (a3) are concerned, these are preferably bromo- or chloro-organo aluminum derivatives, even more preferably chloro-organo aluminum derivatives. Typical examples of organo chloro-aluminum compounds are diethyl aluminum chloride, ethyl aluminum sesquichloride, ethyl aluminum dichloride, ethyl aluminum dibromide, ethyl aluminum sesquichloride.

The ratio between the component (a1) and component (a2) usually ranges from 1/0.5 to 1/30, preferably from 1/2 to 1/15.

The ratio between the component (a1) and component (a3) usually ranges from 1/0.5 to 1/10, preferably from 1 to 1/5.

With respect to the solvent used in step (a), this is selected from inert organic solvents previously anhydrified, such as saturated aliphatic hydrocarbons, for example butane, pentane, hexane, heptane; saturated alicyclic hydrocarbons, for example cyclopentane and cyclohexane; mono-olefins such as 1-butene and 2-butene; aromatic hydrocarbons, for example benzene, toluene, xylene; halogenated hydrocarbons such as methylene chloride, chloroform, carbon tetrachloride, trichloro ethylene, perchloro ethylene, 1,2-dichloro ethane, chloro benzene, bromo benzene, chloro toluene. In the preferred embodiment, the solvent is selected from saturated aliphatic hydrocarbons. As mentioned above, the solvent must be as anhydrous as possible and free of protogenic substances. A distillation followed by a treatment on alumina beds and molecular sieves 3A is sufficient for obtaining a suitable solvent.

The reaction of step (a) can be carried out under adiabatic or isothermal conditions. In any case, the temperature of step (a) ranges from 20 to 120° C., preferably from 25 to 95° C.

As far as the reaction times are concerned, these vary in relation to the operating conditions. As an example, in step (a) a complete conversion is obtained in 1–1.5 hours at a temperature of 60° C.; at higher temperatures the reaction rate increases and the conversions are complete in more reduced times, for example in 30' at 80° C.

Again in step (a) the polymerization degree is regulated by acting on the ν=BDE/(Nd+Al/n) ratio. The quantity of Nd determines the reaction rate, this generally oscillates between 1 and 2.5 mmoles/kg of monomer and is selected on the basis of the pre-established operating conditions; if high reaction rates are required, greater quantities of component (a1) are used, possibly increasing the (a1)/(a2) ratio and maintaining the (a1)/(a3) ratio within the range indicated. The n index depends on the temperature and is equal to about 3 for isothermal polymerizations carried out at 60° C. to a value of 1 for polymerizations carried out at temperatures up to 100° C.

Again, as far as step (a) is concerned, in the preferred embodiment, the component (a1) is added to the mixture of reagents as the last ingredient. If a batch reactor is used, the measured quantity of component (a1) is added to the mixture consisting of the solvent, the monomer, component (a2) and component (a3). The addition of component (a3) as the last ingredient to the mixture consisting of the solvent, the monomer, component (a1) and component (a2), causes a widening of the molecular weight distribution, with a consequent enrichment in the >$10^6$ molecular weight fraction and generally a lower polymerization rate; both these parameters prove to be in relation to the contact time between component (a1) and component (a2) and the temperature at which the two above components interact.

When the polymer is prepared in a continuous reactor, the feeding of component (a1) is preferably effected as close as possible to the polymerization reactor or, even more preferably, in the polymerization reactor itself.

At the end of step (a) the polymeric solution is treated with a peroxide in a quantity ranging from 0.2 g to 2 g per 1,000 g of initial butadiene, preferably from 0.4 g to 1 g per 1,000 g of initial butadiene.

In the preferred embodiment, the above peroxide can be fed to the mixture at the outlet of step (a) by means of a solution in one or more hydrocarbons compatible with the polymerization solvent. The temperature of step (b) ranges from 20° C. to 150° C., preferably from 70 to 120° C. The reaction between the stream leaving step (a) and the peroxides takes place in rapid times, normally in less than 15 minutes.

A part of the invention includes having found an advantage in feeding the peroxide in the polymeric solution which is still active (step b) without proceeding with its previous deactivation by means, for example, of stearic acid, as indicated in the patent U.S. Pat. No. 5,567,784.

The reaction between peroxides and organometallic compounds is immediate and is described as being a redox reaction, generating primary alkyl or alkoxyl radicals, between organic compounds of Al and a form of oxidized oxygen (−1) [cfr. *Comprehensive Organometallic Chemistry*, First Edition 1982, Pergamon Press, 1, (577)]. According to this hypothesis the primary radicals (alkyl or alkoxide depending on the type of peroxide used) extract protons from the methylene allyls of the polymeric chain and/or react with the butadiene. The reaction of primary radicals with the macromolecule generates macro-radicals which, by coupling, provide branched macromolecules. There is therefore a post-modification system which does not introduce foreign substances into the rubber, substances which can modify, by interaction with the accelerating agents, the vulcanization rate.

The peroxide used in step (b) can be selected from alkyl, benzyl and aryl peroxides; peresters; peranhydrides, percarbonates. In the preferred embodiment, the peroxide used in step (b) is selected from dimyristyl peroxydicarbonate and di(3,5,5-trimethyl hexanoyl)peroxide. The latter are commercial products, commercialized for example by Akzo under the trade-name of Perkadox® 26 and Trigonox® 36 respectively.

Any possible deficiencies in Al-alkyls (it should be remembered that a very low Al/Nd operating ratio is adopted), insufficient for guaranteeing the completion of the redox reaction between peroxide and organometallic compounds in solution, can be compensated by introducing a further aliquot of Al-alkyl before the addition of the peroxide. It has been found, in fact, that the addition of a reducing substance such as, for example, an organometallic compound of Al added at the end of the polymerization, is capable of reacting with the peroxide added, allowing the branching reaction to be completed, if this is limited due to the possible scarcity of catalytically active organometallic compounds: this situation can arise when a quantity of catalyst lower in moles than the peroxide added, is adopted.

The reaction of step (b) does not create any problems relating to colour or bad odours.

Step (c) consists of recovering the polybutadiene by means of a so-called flash operation; the rapid decrease in the pressure causes the loss by evaporation of the residual monomer and part of the solvent with a consequent increase in the concentration of the polymer in the solution: this operation is carried out when step (b) has been completed and is effected with the conventional techniques; it is followed by the quenching of the catalytic system by means of protic substances, for example water.

With respect to the process described in U.S. Pat. No. 5,567,784, the process of the present invention allows a branched polybutadiene to be obtained without the use of sulfurated compounds.

The polybutadiene with a low branching degree obtained according to the process of the present invention has rheological characteristics which are such as to optimize its behaviour in the mixing phase with reinforcing fillers.

More specifically, some of the polybutadienes obtained according to the process of the present invention are particularly interesting, as they are capable of significantly reducing the processing cycles referring to the addition of the filler and subsequent extrusion processes. The above polybutadienes consequently prove to be particularly useful as elastomeric components in vulcanizable blends.

The present invention therefore also relates to sulfur vulcanizable elastomeric blends comprising polybutadiene having a content of 1,4-cis units greater than 92%, the above polybutadiene being characterized by the following properties:

(x) Polydispersity index from 2.4 to 2.7, preferably from 2.5 to 2.6;
(xi) tan δ value ranging from 0.9 to 1.30, preferably from 1.15 to 1.25;
(xii) $g_M$ value ranging from 0.80 to 0.99, preferably from 0.90 to 0.96;
(xiii) Mooney viscosity value ranging from 40 to 47, preferably from 44 to 46.

These parameters are determined according to the methods described in the following paragraph.

In the blend of the present invention, the elastomeric part can consist solely of the polybutadiene described above, or partly of the polybutadiene described above and partly of other elastomers.

For example, the polybutadiene described above can be mixed with natural rubber or with styrene-butadiene statistic copolymers obtained by means of anionic or radicalic polymerization in emulsion with compositions in styrene up to 70%.

The elastomeric part however preferably contains at least 60% of the polybutadiene described above.

The blends of the present invention can be used in the preparation of car wheel treads or for the construction of the contact part between the tyre and wheel rim; in the latter case, blends are preferred, in which the main constituent, if not the only constituent, consists of the polybutadiene of the present invention together with a high content of reinforcing filler generally consisting of carbon black.

As is known to experts in the field, the above blends, for economic and/or practical reasons in the subsequent processing, are normally mixed with reinforcing fillers (for example carbon black and silica) up to a maximum of 50% by weight, preferably up to a maximum of 30% by weight, and/or plasticizers, aromatic or naphthene or paraffinic oils, paraffinic waxes, up to a maximum of 60% by weight.

The blends of the present invention therefore comprise, in addition to the elastomeric component, carbon black, mineral fillers, plasticizers, vulcanization additives, etc.

As an example, the total of the elastomeric component of the blend object of the invention corresponding to 100 parts, the remaining parts of the blend are divided as follows:

from 20 to 350 parts of carbon black, preferably from 50 to 200;

from 0 to 200 parts, preferably from 0 to 50 parts, of mineral filler, preferably selected from calcium carbonate, kaolin, silica and talc;

from 0 to 150 parts, preferably from 25 to 90 parts of plasticizer; for example mineral oil with various compositions partly aromatic, naphthenic and paraffinic and paraffinic wax;

from 0 to 2 parts of process coadjuvant additive, stearic acid and polyethylene glycol being preferred;

from 0 to 5 parts of antioxidant;

from 0 to 10 parts of Zinc or Lead oxide.

The carbon black used in the blends can be of the HAF, ISAF, SAF and similar types. More specifically, the carbon black has an iodine absorption of not less than 60 mg/g and a dibutyl phthalate absorption of not less than 80 ml/100 grams.

Vulcanizing agents well known to experts in the field and used for the vulcanization of blends based on polybutadiene, preferably sulfur, are also adopted. The latter is used in a quantity ranging from 0.1 to 3 parts by weight, preferably from 0.5 to 2 parts by weight per 100 parts of the elastomeric composition.

Vulcanization accelerating agents, for example compounds deriving from thiazole, for example "M" (2-mercapto benzo thiazole), "CZ" (N-cyclohexyl-2-benzothiazyl sulfenamide), TBBS, N-tert-butyl-2-benzothiazole sulfenamide, can also be used. These vulcanization accelerating agents are normally present in a quantity ranging from 0.1 to 5 parts by weight, preferably from 0.2 to 3 parts by weight with respect to the elastomeric composition.

These vulcanizing agents can be added either during the first phase of the mixing or, preferably, during a subsequent phase: the choice of the vulcanizing system and feeding method, however, depends on the type of equipment and technologies used in the mixing phase.

The blend of the present invention is obtained by mixing in a mixer, for example using internal mixers (for example Brabender), forming and vulcanization.

Figure 2:
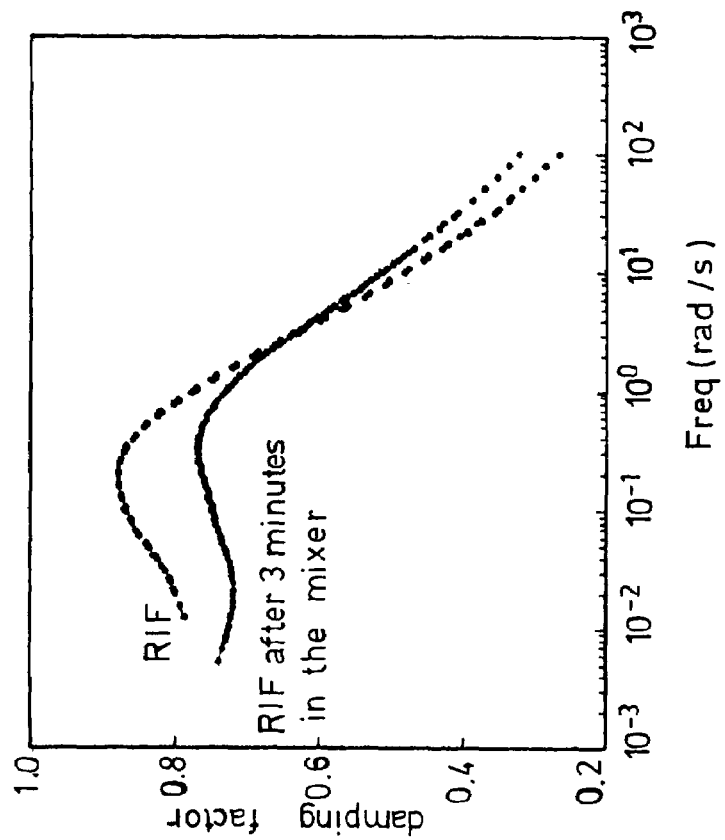
FIG. 2 shows the tan δ vs frequency curve for Polymer RIF.

The following examples are provided for a better understanding of the present invention.

EXAMPLES

Characterization of the Polymers

The following analytical measurements are normally effected on the polymers:

Mooney viscosity, according to the method ASTM D 1646

IR analysis of the microstructure (cis content). The method is based on the calculation of the ratios between the intensities of the bands attributed to 1,4-trans and 1,2-vinyl isomers and a reference band (internal standard) which drops at 1312 cm$^{-1}$ (L. J. Bellamy, The Infrared Spectra of Complex Molecules, Vol. I Third Edition, Chapman and Hall). The 1,4-cis content is determined by the difference to 100. The preparation of the sample is effected on a polybutadiene film obtained starting from a solution evaporated on a KBr tablet.

Determination of the molecular mass distribution (MWD), according to the method commonly used via SEC (GPC) in tetrahydrofuran at T=25° C., using PL-MIXED A (X 4) columns and the determination of the molecular masses according to the Universal Calibration method (κ=0.000457 dl/g and α=0.693).

Determination of the average molecular weight and measurement of the branching degree by means of the SEC/MALLS technique according to an internal method deduced from the work described in *Application Note, Nr. 9*, Wyatt Technology and Pavel Kratochvil, *Classical Light Scattering from Polymer Solutions*, Polymer Science Library, 5, Elsevier Science Publishers B.V. 1987. By coupling a multi-angle light diffusion detector (MALLS) with a traditional SEC/RI elution system, it is possible to contemporaneously measure in absolute the molecular weight and gyration radius of the macromolecules which are separated by the chromatographic system; the quantity of light diffused from a macromolecular species in solution can, in fact, be used directly for obtaining its molecular weight, whereas the angular variation of the scattering is directly correlated to its average dimensions of the molecule in solution. The fundamental relation which is used is as follows:

$$\frac{K*c}{R_\theta} = \frac{1}{M_w P_\theta} + 2A_2 c \qquad 1)$$

wherein:

K*=optical constant, which depends on the wave length of the light used, the dn/dc of the polymer, the solvent used $M_w$=weight average molecular weight c=concentration of the polymeric solution $R_\theta$=diffused light intensity measured at an angle θ.

$P_\theta$=function which describes the diffused light angular variation $A_2$=second virial coefficient of the solvent, equal to 1 for θ angle equal to 0.

For very low concentrations (typical of a SEC system), 1 is reduced to $$\frac{K*c}{R_\theta} = \frac{1}{M_w P_\theta} \qquad 2)$$

and by effecting the measurement on several angles, the extrapolation at angle zero of the $K*c/R_\theta$ function in relation to $sen^2\theta/2$ directly provides the molecular weight of the intercept value and the gyration radius from the slope.

Furthermore, as this measurement is effected for each slice of the chromatogram, it is possible to obtain both a molecular weight and gyration radius distribution.

The macromolecular dimensions in solution are directly correlated to their branching degree: with the same molecular weight, the smaller the dimensions of the macromolecule with respect to the corresponding linear macromolecule, the higher the branching degree; the data relating to the macrostructure of a polymer are quantitatively deduced, by evaluating the branching index $g_M$, which is defined for each macromolecule, as a ratio between the average quadratic gyration radius of the branched macromolecule and that of the linear macromolecule, with the same molecular weight:

$$g_{Mi} = \left[\frac{<r^2>_b}{<r^2>_i}\right]_{Mi} \qquad (3)$$

The average branching index $g_M$ represents the average of said ratio in relation to the molecular mass distribution, and ranges from 0 to 1.

Determination of the Visco-elastic Characteristics of Linear, Modified Polymers.

The linear polymers (A, B, C, D, E), prepared solely according to the first process step of the present invention, and the corresponding modified polymers with different branching degrees, introduced according to the process of the present invention (BM, CM, DM1, DM2, DM3, EM), are characterized by means of dynamic-mechanical analysis by measuring the damping factor, i.e. tan δ at 0.01 Hz, 100° C. and 1% strain.

The tan δ measurement allows the combined effect of the molecular weight distribution and presence of branchings to be evaluated: low tan δ values (<1) are typical of a polymer with elastic characteristics greater than those of a polymer with tan δ>1. The contribution of the high molecular weights (see polymer A) causes a good elasticity, which is detrimental, however, for a rapid wetting phase of the filler: the elimination of the high MW (see polymers B, C, D, E) favours the wetting phase rate, but not the efficiency of the dispersion: the introduction of branchings, with the same MWD (polymers BM, CM, DM1, DM2, DM3, EM), provides elasticity (G' increases, tan δ decreases), facilitating the dispersion of the carbon black.

Characterization of the Blends

The blends are characterized as follows:
Measurement of the Mooney viscosity according to ASTM D 1646.
Calculation of the Δ Mooney of the blend: the difference between the Mooney viscosity of the polymer as such is compared with that of the blend.

Dynamic-mechanical determination of the elastic modulus of the blend: G' at 1 Hz, 100° C. and 1% strain.

These parameters, taken as a whole, give a valid indication of the incorporation rate and excellence dispersion of the filler in the polymeric matrix.

Neodymium Versatate Used in the Preparative of Polymers.

The syntheses of the polymers are effected using two types of Nd-versatate, Nd1 and Nd2, characterized by the presence of different aliquots of water and free versatic acid, in particular

|     | RCOOH/Nd (moles/moles) | H₂O/Nd (moles/moles) |
| --- | --- | --- |
| Nd1 | 2 | 1 |
| Nd2 | 0.3 | 0.05 |

Nd1 was prepared by reacting $Nd_2O_3$ and versatic acid in the presence of HCl in a hydrocarbon solvent at boiling point, effecting a partial elimination of the water by distillation, once the reaction has been completed;

Nd2 was prepared following the disclosures of the Rhodia patent (U.S. Pat. No. 6,090,926).

EXAMPLES

Synthesis of Polybutadienes A–E

Tables 1 and 2 respectively indicate the preparation conditions of the polybutadienes and the relative characteristics.

Comparative Example 1

Synthesis of Polymer A 10 kg of an anhydrous hydrocarbon solvent consisting of a mixture of hexanes and brought to a temperature of 60° C. are fed to a twenty liter autoclave equipped with a stirrer and cooling system. The following products are added in order to this solvent: 1200 g of anhydrous butadiene, Nd versatate of the Nd1 type, corresponding to 2.8 mmoles of Nd per 1,000 g of butadiene, DIBAH in a molar ratio with respect to the Nd equal to 6 and, at the end, DEAC in a molar ration with respect to the Nd equal to 3. After 90' the reaction is considered complete and is interrupted; a conversion of 98% is measured; the solvent is eliminated from the solution containing phenolic antioxidant (Irganox® 1520, in a quantity of 0.06% with respect to the polymer), by the introduction of vapour. The coagulated product is dried before being pressed in a cold calender and the drying is then completed in a calender with rolls at 80° C.

The $M_w$ measured by GPC has a value of 390,000, whereas the dispersion index $M_w/M_n$ measured by GPC is equal to 3.8. Upon MALLS analysis the polymer proves to be linear ($g_M$=1) the cis content equal to 97% and the Mooney viscosity 42.

Example 2

Synthesis of Polymer B

A polymer having the characteristics indicated in Table 1 is prepared under the same conditions and with the same quantities of reagents, using however an Nd versatate of the Nd2 type. The reaction rate is increased so as to have a practically complete conversion (99.5%) is reached in 60'.

After adding 0.06% w with respect to the Irganox® 1520 polymer, the solvent is eliminated using the same procedure described above; analysis of the polymer shows various differences with respect to the previous point: in particular $M_w$ GPC is equal to 290,000 and the dispersion index is equal to 2.6. The Mooney viscosity is consequently lower (30). The $g_M$ value is equal to 1, indicating a linear polymer.

Example 3

Synthesis of Polymer C

The quantity of Nd versatate of the Nd2 type is reduced, under the same conditions specified in Example 2, to 2.5 mmoles per 1,000 g of butadiene, as also the DIBAH/Nd ratio which is brought to 3.6 and the DEAC/Nd ratio which is brought to 2.5. Also in this case, the conversion is practically complete after 60' (99%). The polymer C containing 0.06% w of Irganox® 1520 is recovered.

Example 4

Synthesis of Polymer D

Anhydrous butadiene and solvent anhydrified by passage over a bed of 3A molecular sieves, are fed to a plant consisting of two 100 l reactors, equipped with wall-scraper stirrers and specific temperature control devices, in such ratios that the concentration of monomer is equal to 12.5% w and the hourly quantity of butadiene is equal to 8 kg/hour: the temperature of the monomer-solvent mixture is 25° C. DIBAH and DEAC are fed in the order in the same feeding line, whereas the Nd-versatate is fed separately directly into the reactor (220 g/hour of a solution at 1.35% of Nd). The hourly quantity of DIBAH fed proved to be 280 g/hour (solution at 0.79% of Al, equal to a DIBAH/Nd ratio=3.98), that of DEAC equal to 105 g/hour (solution at 1.6% w of Al, equal to a DEAC/Nd ratio=3).

The conversion at the outlet of the first reactor (60' of residence time) was equal to 85% w (with a temperature of about 85° C.) whereas at the outlet of the second reactor, the conversion was 99.5% w: in this case, the temperature was kept at round 95° C. also with the possible help of vapour introduced into the reactor jacket. The molecular weight ($M_w$) of the material measured with GPC proved to be equal to 320,000 with a dispersion index centered at 2.6 and a linear structure. The quantity of antioxidant (Irganox® 1520) added to the polymer proved to be equal to 0.06%. See Table 2 for the characteristics of the polybutadiene.

Example 10a

Preparation of Polymer E

Anhydrous butadiene and solvent anhydrified by passage over a bed of 3A molecular sieves, are fed to a plant consisting of two 100 l reactors, equipped with wall-scraper stirrers and specific temperature control devices, in such ratios that the concentration of monomer is equal to 12.5% w and the hourly quantity of butadiene is equal to 8 kg/hour: the temperature of the monomer-solvent mixture fed to the first reactor is 25° C. DIBAH and DEAC are fed in this order in the same feeding line, whereas the Nd-versatate is fed separately directly into the reactor (200 g/hour of a solution at 1.35% of Nd equal to 2.34 mmoles of Nd per 1,000 g of butadiene). The hourly quantity of DIBAH fed proved to be 240 g/hour (solution at 0.79% of Al, corresponding to a DIBAH/Nd molar ratio=3.75), that of DEAC equal to 95 g/hour (solution at 1.6% w of Al, equal to a DEAC/Nd ratio=3).

The conversion at the outlet of the second reactor was 99.5% w: the temperature was kept at round 95° C. also with the possible help of vapour introduced into the reactor jacket. The molecular weight ($M_w$) measured on a sample extracted from the process measured with GPC proved to be equal to 350,000 with a dispersion index centered at 2.6 and a linear structure. The Mooney viscosity proved to be 40. Irganox® 1520 was added as antioxidant in a quantity of 0.06% with respect to the polymer.

Examples 5–10b

Post-modification of Polybutadienes

The following examples relate to the post-modification of polymers A–E (step b of the process of the present invention) and the recovery of the polybutadienes thus modified (step c of the process).

The above post-modification is effected by adding a solution, in a hydrocarbon solvent, of an organic peroxide to the polymeric solution under such conditions that the catalytic system is still active and, in all cases, not in contact with water, air or substances capable of reacting with the organometallic compounds contained therein.

Two types of peroxide were used: Dimyristyl peroxydicarbonate commercialized by AKZO NOBEL under the trade-name of Perkadox® 26 (MW 514.8) and di(3,5,5,5-trimethyl hexanoyl) peroxide commercialized by AKZO NOBEL under the trade-name of Trigonox® 36-CD75 (MW 314.5).

Example 10 (preparation of polymer E) describes the procedure of step (a) above and the subsequent post-modification phase (b and c).

Comparative Example 5

Post-modification of Polymer (A) to Give the Post-modified Polymer AM

When the reaction carried out according to the procedure described in Example 1 has been completed, the reaction mixture obtained at the end of the process described in Example 1 is treated with a hexane solution at 3% of Dimyristyl peroxydicarbonate. The solution is transferred to a second reactor after passage in a mixer in which the excess of organometallic compounds forming the residue of the catalytic systems is destroyed with water. The primary antioxidant Irganox® S65 and secondary antioxidant TMPP are then added. After the elimination of the solvent and drying, the polymer has a Mooney viscosity equal to 49 (Polymer AM).

Example 6

Post-modification of Polymer B to Give the Post-modified Polymer BM 10 kg of an anhydrous hydrocarbon solvent consisting of a mixture of hexanes and brought to a temperature of 60° C., are fed to a twenty liter autoclave equipped with a stirrer and cooling system. The following products are added in order to the solvent: 1,200 g of anhydrous butadiene, Nd versatate of the Nd2 type, corresponding to 2.8 mmoles of Nd per 1,000 g of butadiene, DIBAH in a molar ratio with respect to the Nd equal to 6 and, at the end, DEAC in a molar ration with respect to the Nd equal to 3. After 60' the reaction is considered complete (the conversion is equal to 99.7%). 0.8 g/1000 g of butadiene, dimyristyl peroxydicarbonate in a solution of a mixture of hexanes at 3%, are added in 10' to the reaction vessel, whose temperature has reached 90° C. The solution is transferred to a second reactor after passage in a mixer where the excess of organometallic compounds forming the residue of the catalytic system is destroyed by reaction with water. The primary antioxidant Irganox® 565 and secondary antioxidant TNPP are then added at 0.15 and 0.05% w respectively with respect to the rubber. This is followed by an elimination phase of the solvent using water vapour at a temperature of 105° C., separation of the damp clots and their subsequent complete drying on a calender. The product (BM) has a Mooney viscosity equal to 45; the molecular characteristics are indicated in Table 3.

Example 7

Post-modification of Polymer C to Give the Post-modified Polymer CM 10 kg of an anhydrous hydrocarbon solvent consisting of a mixture of hexanes and brought to a temperature of 60° C., are fed to a twenty liter autoclave equipped with a stirrer and cooling system. The following products are added in order to this solvent: 1,200 g of anhydrous butadiene, Nd versatate of the Nd2 type, corresponding to 2.5 mmoles of Nd per 1,000 g of butadiene, DIBAH in a molar ratio with respect to the Nd equal to 3.6 and, at the end, DEAC in a molar ration with respect to the Nd equal to 3. After 60' the reaction is considered complete (the conversion is equal to 99.4%). 0.4 g/1,000 g of butadiene, dimyristyl peroxydicarbonate in a solution of a mixture of hexanes at 3%, are added in 10' to the reaction vessel, whose temperature has reached 90° C. The solution is transferred to a second reactor after passage in a mixer, where the excess of organometallic compounds forming the residue of the catalytic system, is destroyed by reaction with water. The primary antioxidant Irganox® 565 and secondary antioxidant TNPP are then added at 0.15 and 0.05% w respectively with respect to the rubber. This is followed by an elimination phase of the solvent using water vapour at a temperature of 105° C., separation of the damp clots and their subsequent complete drying on a calender. The product (CM) has a Mooney viscosity equal to 45; the molecular characteristics are indicated in Table 3.

Example 8

Post-modification of Polymer D to Give the Post-modified Polymer DM1

The hydrocarbon solution containing polybutadiene prepared according to the indications of Example 4, containing organometallic compounds forming the catalytic site, avoiding contact with air, water or substances capable of oxidizing the organometallic species present, was sent by means of a specific pipe equipped with a flow-rate measurement system fixed at 100 liters/hour, to two mixers arranged in series, each consisting of a 5 liter vessel, with a high h:w ratio (height:width) in which stirring was effected by radial impellers and break-flow devices. A hydrocarbon solution at 3% of di(3,5,5-trimethyl hexanoyl) peroxide was added to each mixer, using two different lines in each of which there was a flow-rate measurer, in a quantity of 0.6 g/hour of peroxide for each feeding point. After the addition, the polymer was sent to a blend: this was followed by the complete neutralization of the organometallic compounds with water, the addition of Irganox® 565 and TNPP in a quantity of 0.15 and 0.5% w respectively, and the elimination of the solvent by means of vapour at a temperature of 105° C. The damp clots of polymer collected in a vibrating screen were subsequently dried by the use of an extruder with die temperatures not exceeding 160° C. A polymer (DM1) was obtained with a Mooney viscosity equal to 39, a MALLS molecular weight (Mw) equal to 339,000, a dispersion index (GPC) equal to 2.6 and a content of cis units equal to 95%.

Example 9

Post-modification of Polymer D to Give the Post-modified Polymer DM2

A hydrocarbon solution at 3% of di(3,5,5-trimethyl hexanoyl) peroxide is fed to each mixer, under the same conditions as Example 7 starting from a parent polymer having the characteristics of polymer D, in a quantity of 0.8 g/hour of peroxide. A polybutadiene (DM2) is obtained with a Mooney viscosity equal to 42, a MALLS $M_w$ equal to 339,000, a dispersion index (GPC) equal to 2.6 and a content of cis units equal to 95.4%.

Example 9b

Post-modification of Polymer D to Give the Post-modified Polymer DM3

A hydrocarbon solution at 3% of di(3,5,5-trimethyl hexanoyl) peroxide is fed to each mixer, under the same conditions as Example 7 starting from a parent polymer having the characteristics of polymer D, in a quantity of 1 g/hour of peroxide. A polybutadiene (DM3) is obtained with a Mooney viscosity equal to 46, a MALLS $M_w$ equal to 347,000, a dispersion index (GPC) equal to 2.6 and a content of cis units equal to 95.2%.

Example 10

Post-modification of Polymer E to Give the Post-modified Polymer EM

When the reaction carried out according to the procedure described in Example 10a was completed, the hydrocarbon solution containing polybutadiene containing organometallic compounds forming the catalytic site, avoiding contact with air, water or substances capable of oxidizing the organometallic species present, was sent by means of a specific pipe equipped with a flow-rate measurement system fixed at 100 liters/hour, to two mixers arranged in series, each consisting of a 5 liter vessel, with a high h:w ratio (height:width) in which stirring was effected by radial impellers and break-flow devices. A hydrocarbon solution at 3% of di(3,5,5-trimethyl hexanoyl)peroxide was added to each mixer, using two different lines in each of which there was a flow-rate measurer, in a quantity of 0.4 g/hour of peroxide/1,000 g of monomer for each feeding point. After the addition, the polymer was sent to a blend: this was followed by the complete neutralization of the organometallic compounds with water, the addition of Irganox® 565 and TNPP in a quantity of 0.15 and 0.5% w respectively, and the elimination of the solvent by means of vapour at a temperature of 105° C. The damp clots of polymer collected in a vibrating screen were subsequently dried by the use of an extruder with die temperatures not exceeding 160° C. A polymer (EM) was obtained with a Mooney viscosity equal to 45, a MALLS $M_w$ equal to 339,000, a dispersion index (GPC) equal to 2.6 and a content of cis units equal to 95%.

TABLE 1

Polymerization conditions

| Polymer | T (° C.) | Time (') | Nd-V$_3$* | DIBAH/Nd** | DEAC/Nd*** |
|---|---|---|---|---|---|
| A# comp. | 60 | 90 | 2.8 | 6 | 3 |
| B# | 60 | 60 | 2.8 | 6 | 3 |
| C# | 60 | 60 | 2.5 | 3.6 | 2.5 |
| D## | 25–95 | 60 + 60 | 2.57 | 3.98 | 3 |
| E## | 25–95 | 60 + 60 | 2.34 | 3.75 | 3 |

*Nd mmoles/1,000 g butadiene
**moles/moles
***moles/moles
batch polymerization
polymerization in continuous

TABLE 2

Characterization of non-modified polybutadienes (obtained at the end of step a)

| Polymer | M$_w$ SEC | M$_w$ MALLS | M$_w$/M$_n$ SEC | g$_M$ MALLS | Cis % | ML |
|---|---|---|---|---|---|---|
| A comp. | 390.000 | 409.000 | 3.8 | 1 | 97 | 42 |
| B | 290.000 | 304.000 | 2.6 | 1 | 96 | 30 |
| C | 350.000 | 367.000 | 2.5 | 1 | 94 | 40 |
| D | 290.000 | 304.000 | 2.6 | 1 | 95 | 30 |
| E | 350.000 | 370.000 | 2.6 | 1 | 96 | 40 |

TABLE 3

Characterization of post-modified polybutadienes (obtained at the end of step c)

| Modified polymer abbrev. | Polymer precursor | Type of peroxide | Peroxide* | M$_w$ MALLS | M$_w$/M$_n$ SEC | ML |
|---|---|---|---|---|---|---|
| AM | A | — | — | | 3.9 | 49 |
| BM | B | Perkadox 26 | 0.8 | 379.000 | 2.6 | 45 |
| CM | C | Perkadox 26 | 0.4 | 380.000 | 2.5 | 45 |
| DM1 | D | Trigonox 36 | 0.6 | 339.000 | 2.6 | 39 |
| DM2 | D | Trigonox 36 | 0.8 | 361.000 | 2.6 | 42 |
| DM3 | D | Trigonox 36 | 1 | 388.000 | 2.6 | 46 |
| EM | E | Trigonox 36 | 0.4 | 390.000 | 2.6 | 45 |

*g peroxide/x1,000 g butadiene

TABLE 4

Characterization of the polymers as such and post-modified

| Polymer | ML | g$_M$ | M$_w$/M$_n$ | tan δ |
|---|---|---|---|---|
| A | 42 | 1 | 3.8 | 0.87 |
| AM | 49 | 0.95 | 3.9 | 0.80 |
| B | 30 | 1 | 2.6 | 1.40 |
| BM | 45 | 0.89 | 2.6 | 0.87 |
| C | 40 | 1 | 2.5 | 1.25 |
| CM | 45 | 0.96 | 2.6 | 1.15 |
| D | 30 | 1 | 2.6 | 1.40 |
| DM1 | 39 | 0.95 | 2.6 | 0.91 |
| DM2 | 42 | 0.93 | 2.6 | 0.89 |
| DM3 | 46 | 0.88 | 2.6 | 0.87 |
| E | 40 | 1 | 2.6 | 1.25 |
| EM | 45 | 0.95 | 2.6 | 1.18 |

Note:
It should be pointed out that the value of the g$_M$ parameter is directly correlated to the branching degree introduced only if, as in this case, the post-modification process and consequently the type of branching, are of the same type.

Comments on Table 4

The tan δ measurement allows the combined effect of the molecular weight distribution and presence of branchings to be evaluated: low tan δ values (<1) are typical of a polymer with greater elastic characteristics than those of a polymer with tan δ>1. The contribution of the high molecular weights (see polymer A) gives a good elasticity, detrimental however for a rapid wetting phase of the filler: the elimination of the high MW (see polymers B, C, D, E) favours the wetting phase rate, but not the efficiency of the dispersion: the introduction of branchings provides elasticity (G' increases, tan δ decreases), facilitating the dispersion of the carbon black during the preparation of the blends.

In the case of post-modified polymers with M$_w$/M$_n$<2.7, therefore excluding the polymer AM, deriving from a polymer having M$_w$/M$_n$>2.7, it is possible to correlate the damping factor to the more or less extensive presence of branchings. The value of g$_M$<1 (direct index of the presence of branchings) only follows this scheme in the case of polymers which, prepared in the same way, have the same type of branches and differ only in the quantity of these.

Preparation of the Blends

The formulations of the blends, the preparation conditions and relative characterizations, are specified below.

For comparative purposes, a blend was prepared with a commercial polybutadiene indicated with the abbreviation RIF, whose characteristics are indicated in Table 5.

TABLE 5

| | M$_w$ MALLS | M$_w$/M$_n$ | g$_M$ | ML | Cis % | Irganox 1520 (w %) |
|---|---|---|---|---|---|---|
| RIF | 397.000 | 2.6 | 0.85 | 46 | 96 | 0.06 |

The RIF polymer was subjected to extraction (two aliquots extracted for 40 hours with methanol), for a complete elimination of the extractable products, and subsequently subjected to X Fluorescence (XRF) analysis. The results obtained were compared with those obtained from a further two aliquots of polybutadiene as such, not subjected to extraction.

The following results (average of two determinations) were obtained for the polymer as such before extraction:

| Element | [mg/kg] | [mmoles/kg] |
|---|---|---|
| Al | 330 | 12.22 |
| Nd | 135 | 0.94 |
| S | 300 | 9.38 |
| Cl | 225 | 6.36 |

The polymer obtained after extraction had the following analysis:

| Element | [mg/kg] | [mmoles/kg] |
|---|---|---|
| Al | 220 | 8.15 |
| Nd | 110 | 0.76 |
| S | 95 | 2.97 |
| Cl | 115 | 3.25 |

The extraction with methanol therefore removed part of the compounds containing Cl and S, in particular those not bound to the macromolecule. The part of these elements which are still present, in the polymer subjected to extraction, as they bound to the macromolecule, are in a practically unitary molar ratio, as can be expected from the presence of a —CH(Cl)=CH—S—S—CH=CH(Cl)— group deriving from the sum of $S_2Cl_2$ on a C=C double bond belonging to a polymeric chain of polybutadiene [J. R. Shelton et al., Proceeding of Inter. Rubber Conf., Washington D.C. (1959)]. The formulation of the blend used is as follows (Table 6):

TABLE 6

| Polybutadiene | 100 phr |
|---|---|
| Carbon black (N330) | 50 phr |
| MES oil | 10 phr |
| ZnO | 4 phr |
| 6PPD** | 3 phr |
| Stearic acid | 3 phr |

**the abbreviation 6PPd refers to N-(1,3-dimethyl butyl)-N'-phenyl p-phenylene diamine, commercialized under the trade-name of Santoflex[R] 13.

The blend was prepared in a Brabender internal mixer with Roller rotors, a 350 cm³ chamber, 30 rpm. The initial temperature was 50° C., whereas the blending times were equal to 3' and 10'. The dispersion degree of the filler and the rate at which it is dispersed are evaluated by combining the results of the Mooney viscosity and the elastic modulus G' measured on the blends at 3' and 10' of time at the mixer; a higher ΔMooney at 10' corresponds to a blend which is more difficult to process and for which 10' of processing are not sufficient, whereas a small difference between the ΔMooney at 3' and 10' indicates a more rapid blending process. In all cases, a lower G' value at 10' corresponds to a better dispersion of the filler. The measurements are indicated in Table 7.

TABLE 7

| POLYMER | ΔMooney 3' | ΔMooney 10' | G' 10' kPa |
|---|---|---|---|
| A | 35 | 27 | 450 |
| B | 31 | 30 | 410 |
| BM | 31 | 24 | 380 |
| C | 28 | 27 | 400 |
| CM | 23 | 21 | 350 |
| D | 31 | 29 | 400 |
| DM1 | 28 | 24 | 380 |
| DM2 | 30 | 24 | 400 |
| DM3 | 30 | 22 | 430 |
| E | 27 | 26 | 390 |
| EM | 22 | 20 | 350 |
| RIF | 22 | 18 | 330 |

Comments on Table 7

4 groups of polymers are identified, distinguished by their behaviour in the blend:
a) rapid wetting phase and optimal dispersion;
b) slow wetting phase and optimal dispersion;
c) rapid wetting phase and unsatisfactory dispersion;
d) slow wetting phase and unsatisfactory dispersion.

Polymers with a low branching degree and a narrow molecular weight distribution (polymers CM, DM1, EM) belong to group a). These polymers are characterized by tanδ values ranging from 1.2 to 0.9; $g_M$ values ranging from 0.95 to 0.99; $M_w/M_n$ lower than 2.7.

Polymers with a high branching degree and a narrow molecular weight distribution (polymers DM2 and DM3, BM) belong to group b). These polymers are characterized by tan δ values lower than 0.9; $g_M$ values lower than 0.95; $M_w/M_n$ lower than 2.7.

Linear polymers with a narrow distribution (polymers B, C, D and E of Table 5) with $M_w/M_n$ lower than 2.7, belong to group c) of polymers. These polymers are characterized by tan δ values higher than 1.2 and, obviously $g_M$=1.

Linear or branched polymers with a wide molecular weight distribution (A and AM) belong to group d). These polymers are characterized by tan δ values lower than 0.9; and $M_w/M_n$ higher than 2.7.

Table 7 also indicates the Δ Mooney measurements of the blends obtained at 3 minutes and at 10 minutes of time in the mixer.

Group a) is considered as being the most satisfactory by transformers, as it combines short processing cycles with an optimal dispersion of the filler (and therefore reinforcement).

Vulcanization of the Blends

The same formulation for the preparation of the blends described above is used as a base for producing vulcanized samples. Sulfur (vulcanizing agent) in a quantity of 1 phr and an accelerating agent (TBBS, N-tert-butyl-2-benzothiazole sulfenamide) in a quantity of 1 phr, are added to the blend prepared at 3' and 10' in the Brabender mixer and mixed for an additional period of 3' again in a Brabender mixer.

The vulcanization is carried out in a press at a temperature of 150° C. for 40 minutes.

A comparison follows between the characteristics of the vulcanized products prepared using blends classified according to the categories indicated above and the blend obtained using the same procedure starting from the reference polymer RIF.

The following polymers are used in particular:
1. EM for group a)
2. DM3 for group b)
3. E for group c)
4. A for group d)

The results are specified in Table 8.

TABLE 8

| | Ultimate tensile strength* | Ultimate elongation* | tanδ 3'** | tanδ 10'** |
|---|---|---|---|---|
| EM | 17.3 | 510 | 0.147 | 0.141 |
| DM3 | 17.7 | 520 | 0.155 | 0.144 |
| E | 16.2 | 480 | 0.158 | 0.156 |
| A | 18.1 | 530 | 0.156 | 0.149 |
| RIF | 17.8 | 520 | 0.144 | 0.145 |

*according to ASTM D412
**time in the mixer

The measurement of the damping factor is effected on vulcanized products obtained starting from the blends prepared at 3' and 10' of time in the mixer: in this way it is possible to measure on the vulcanized product the effect on the end properties of the length of the mixing cycle.

On observing the data indicated in Table 8, it is evident that both the EM and RIF polymers reach the best performance in terms of tan δ already after 3', unlike polymers A and DM3 for which 10' are necessary (slower dispersion phase).

Polymer E which is lacking in terms of elastic component is not capable however of reaching the same performances as the others even at longer times.

All the polymers tested, except for RIF, keep their tan δ values with an increase in the mixing time; this fact can be correlated to the different technique with which the branchings are introduced and is therefore correlated with the thermo-mechanical stability of the material, the antioxidant system being substantially equivalent.

The tan δ vs frequency curves are indicated below at 60° C. and 0.1% strain for the polymers EM and RIF mixed for 3' in a Brabender, without any additive except for the antioxidant which, as already mentioned, is the same type for both and in the same quantity.

Figure 1:
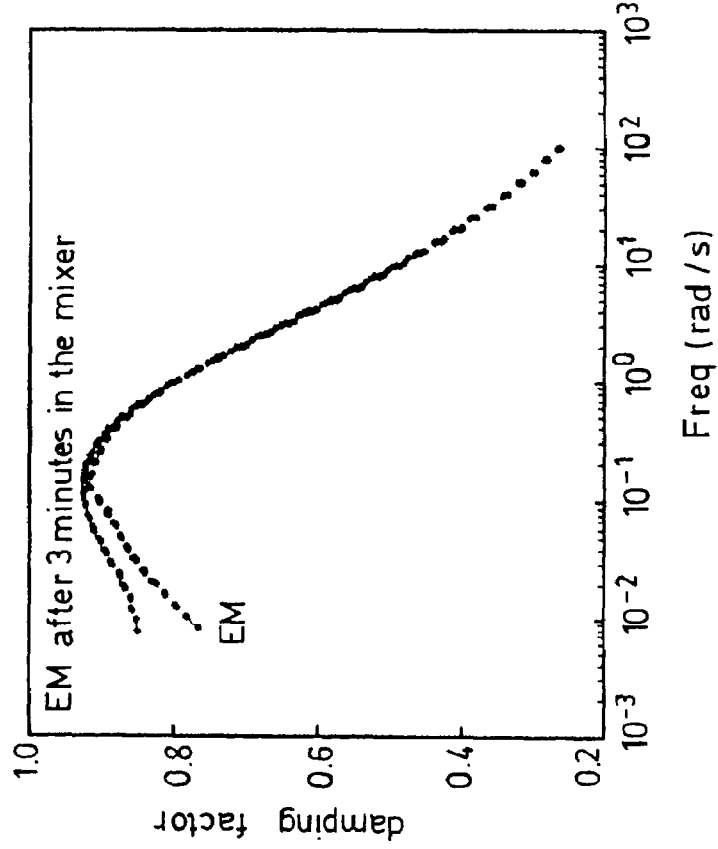
FIG. 1 shows the tan δ vs frequency curve for Polymer EM.

Whereas the polymer EM remains practically unchanged, the polymer RIF shows a variation in the tan δ in almost all the field of frequencies covered: this variation can be attributed to a modification in the molecular weight distribution and branching, as can be seen in the following FIGS. 1 and 2 and from the SEC analysis specified in Table 9.

TABLE 9

|     | Mw     | Mw/Mn |
|-----|--------|-------|
| EM  | 380000 | 2.6   |
| RIF | 420000 | 2.7   |

The invention claimed is:

1. A process for the preparation of polybutadiene with a low branching degree having the following characteristics:
   branching index value (gM) lower than 1;
   damping coefficient value (tanδ), defined as the trigonometric tangent of the ratio between the viscous modulus (G") and the elastic modulus (G') [tan δ=G"/G'] measured at 0.01 Hz, 100° C. and 1% of strain, ranging from 0.80 to 1.40;
   Mooney viscosity lower than 49;
   $M_w/M_n$ lower than 2.9;
   percentage of 1,4-cis units higher than 93%;
   the above process being effected by the polymerization of 1,3-butadiene in the presence of neodymium catalysts, the above process comprising:
   (a) a first polymerization step of butadiene in the presence of organic solvents and in the presence of a catalytic system comprising (a1) a derivative of neodymium selected from neodymium carboxylates with a molar ratio $H_2O/Nd$ lower than 1, and a molar ratio —COOH/Nd lower than 2; (a2) an aluminum alkyl having the general formula (I) $AlR_1R_2R_3$ wherein $R_1$ and $R_2$, the same or different, are an alkyl radical containing from 1 to 10 carbon atoms or a hydrogen atom, $R_3$ is an alkyl radical containing from 1 to 10 carbon atoms; (a3) an organo aluminum derivative containing at least one halogen atom; the above first step being carried out up to a butadiene conversion ≧98% to give a linear polybutadiene ($g_M=1$) with a content of 1,4-cis units greater than 93%, and an $M_w/M_n$ ranging from 2.2 to 2.9;
   (b) treatment of the polymeric solution obtained at the end of step (a) with a peroxide until polybutadiene with a low branching degree is obtained;
   (c) recovery of the polybutadiene with a low branching degree obtained at the end of step (b).

2. The process according to claim 1, wherein the neodymium carboxylate is neodymium versatate.

3. The process according to claim 1, wherein the neodymium carboxylate is present in a quantity ranging from 0.0001 to 1.0 mmoles per 1.000 grams of butadiene to be polymerized.

4. The process according to claim 3, wherein the neodymium carboxylate is present in a quantity ranging from 0.0005 to 5.0 mmoles per 1.000 grams of butadiene to be polymerized.

5. The process according to claim 1, wherein the aluminum compounds (a2) are selected from aluminum triethyl, aluminum tri-isobutyl, aluminum diethyl hydride and aluminum di-isobutyl hydride.

6. The process according to claim 1, wherein the halogen aluminum alkyl derivatives (a3) are selected from chloro organo aluminum derivatives.

7. The process according to claim 6, wherein the chloro organo aluminum derivatives are selected from diethyl aluminum chloride, ethyl aluminum sesquichloride, ethyl aluminum dichloride, ethyl aluminum dibromide, ethyl aluminum sesquichloride.

8. The process according to claim 1, wherein the molar ratio $H_2O/Nd$ is lower than 0.1, and the molar ratio —COOH/Nd is lower than 0.5.

9. The process according to claim 1, wherein the conversion of butadiene at the end of step (a) is higher than 99%.

10. The process according to claim 1, wherein the polybutadiene with a low branching degree has a branching index value ($g_M$) ranging from 0.80 to 0.99.

11. The process according to claim 10, wherein the polybutadiene with a low branching degree has a branching index value ($g_M$) ranging from 0.90 to 0.96.

12. The process according to claim 1, wherein the damping coefficient (tan δ) of the polybutadiene with a low branching degree ranges from 0.90 to 1.30.

13. The process according to claim 12, wherein the damping coefficient (tan δ) of the polybutadiene with a low branching degree ranges from 1.15 to 1.25.

14. The process according to claim 1, wherein the Mooney viscosity of the polybutadiene with a low branching degree ranges from 35 to 48.

15. The process according to claim 14, wherein the Mooney viscosity ranges from 39 to 46.

16. The process according to claim 1, wherein the $M_w/M_n$ of the polybutadiene with a low branching degree ranges from 2.4 to 2.7.

17. The process according to claim 16, wherein $M_w/M_n$ ranges from 2.5 to 2.6.

18. The process according to claim 1, wherein the percentage of 1,4-cis units of the polybutadiene with a low branching degree is higher than 94%.

19. The process according to claim 18, wherein the percentage of 1,4-cis units ranges from 95% to 99%.

20. The process according to claim 1, wherein the reaction of step (a) is carried out under adiabatic conditions or in isothermal conditions.

21. The process according to claim 20, wherein the temperature of step (a) ranges from 20 to 120° C.

22. The process according to claim 1, wherein in step (b) the polymeric solution obtained at the end of step (a) is treated with a peroxide in a quantity ranging from 0.2 to 2 grams of peroxide per 1,000 grams of initial butadiene.

23. The process according to claim 22, wherein in step (b) the polymeric solution obtained at the end of step (a) is treated with a peroxide in a quantity ranging from 0.4 to 1 gram of peroxide per 1,000 grams of initial butadiene.

24. The process according to claim 1, wherein in step (b) the polymeric solution obtained at the end of step (a) is treated with a peroxide selected from dimyristyl peroxydicarbonate and di(3,5,5-trimethyl hexanoyl)peroxide.

25. The process according to claim 1, wherein the temperature of step (b) ranges from 80° C. to 120° C.

26. The process according to claim 25, wherein the temperature of step (b) ranges from 90° C. to 110° C.

27. Elastomeric blends vulcanizable with sulfur comprising polybutadiene having a content of 1,4-cis units greater than 92%, the above polybutadiene being characterized by the following properties:
Polydispersity index from 2.4 to 2.7;
tan δ value ranging from 0.9 to 1.30;
$g_M$ value ranging from 0.80 to 0.99;
Mooney viscosity value ranging from 40 to 47.

28. The elastomeric blends vulcanizable with sulfur according to claim 27, wherein the polybutadiene has a polydispersity index ranging from 2.5 to 2.6.

29. The elastomeric blends vulcanizable with sulfur according to claim 27, wherein the polybutadiene has a tan δ value ranging from 1.15 to 1.25.

30. The elastomeric blends vulcanizable with sulfur according to claim 27, wherein the polybutadiene has a $g_M$ value ranging from 0.90 to 0.96.

31. The elastomeric blends vulcanizable with sulfur according to claim 27, wherein the polybutadiene has a Mooney viscosity ranging from 44 to 46.

32. The elastomeric blends vulcanizable with sulfur according to claim 27, further comprising carbon black in a quantity ranging from 20 to 350 parts per 100 parts of elastomeric component.

33. The process according to claim 1, wherein the at least one halogen is chlorine.

34. The process according to claim 20, wherein the temperature of step (a) ranges from 25 to 95° C.

* * * * *